US012779265B2

(12) United States Patent
Lin

(10) Patent No.: US 12,779,265 B2
(45) Date of Patent: Nov. 3, 2026

(54) ELECTRIC VEHICLE FIRE EXTINGUISHING DEVICE

(71) Applicant: Jhe-Yi Lin, New Taipei (TW)

(72) Inventor: Jhe-Yi Lin, New Taipei (TW)

( * ) Notice: Subject to any disclaimer, the term of this patent is extended or adjusted under 35 U.S.C. 154(b) by 0 days.

(21) Appl. No.: 19/200,263

(22) Filed: May 6, 2025

(65) Prior Publication Data

US 2026/0097248 A1 Apr. 9, 2026

(30) Foreign Application Priority Data

Oct. 7, 2024 (TW) ................................ 113138087

(51) Int. Cl.

| | |
|---|---|
| ***A62C 3/16*** | (2006.01) |
| ***A62C 3/07*** | (2006.01) |
| ***A62C 35/62*** | (2006.01) |
| ***A62C 35/68*** | (2006.01) |
| ***B60L 3/00*** | (2019.01) |
| ***H01M 50/673*** | (2021.01) |
| *B60R 16/03* | (2006.01) |
| *B60R 16/08* | (2006.01) |

(52) U.S. Cl.

CPC ................ *A62C 35/68* (2013.01); *A62C 3/07* (2013.01); *A62C 3/16* (2013.01); *A62C 35/62* (2013.01); *B60L 3/0046* (2013.01); *H01M 50/673* (2021.01); *B60R 16/03* (2013.01); *B60R 16/08* (2013.01); *H01M 2220/20* (2013.01)

(58) Field of Classification Search

CPC .. A62C 35/68; A62C 3/07; A62C 3/16; A62C 35/62; B60L 3/0046; H01M 50/673; H01M 2220/20; B60R 16/03; B60R 16/08

See application file for complete search history.

(56) References Cited

U.S. PATENT DOCUMENTS

| | | | | |
|---|---|---|---|---|
| 2003/0181950 A1* | 9/2003 | Powers | ................ | A61N 1/3975 607/5 |
| 2023/0181950 A1 | 6/2023 | Bäder et al. | | |

FOREIGN PATENT DOCUMENTS

| | | |
|---|---|---|
| CN | 108237927 A | 7/2018 |
| CN | 115476704 A | 12/2022 |
| JP | 5849692 B2 | 2/2016 |
| KR | 102494248 B1 | 2/2023 |
| WO | 2024/113646 A1 | 6/2024 |

* cited by examiner

*Primary Examiner* — Qingzhang Zhou

(74) *Attorney, Agent, or Firm* — MUNCY, GEISSLER, OLDS & LOWE, P.C.

(57) ABSTRACT

An electric vehicle fire extinguishing device includes a structural cavity channel formed within a battery compartment of the electric vehicle, and a connector extended the channel to a surface of a vehicle body structure. In one example, the connector is connected to a corresponding connector, a pipeline, a control panel, and a fire extinguishing agent external supply unit outside the vehicle. A detector sends a signal to the control panel in an event of sensing a fire, and a fire extinguishing agent pipe valve is opened automatically to release an agent inside. In another example, the connector is connected to a corresponding connector, a pipeline, and a fire extinguishing water source external supply unit outside the vehicle, and a fire extinguishing water source pipeline is opened manually to release a water source inside.

10 Claims, 9 Drawing Sheets

ELECTRIC VEHICLE FIRE EXTINGUISHING DEVICE

TECHNICAL FIELD

The present invention relates to a fire extinguishing device, in particular to an electric vehicle fire extinguishing device.

Background Art

Electric vehicles typically have a battery compartment disposed in the vehicle chassis and configured in a nearly closed state. When a fire occurs inside the battery compartment, the only available method is to spray a large amount of fire extinguishing agent for a long time from the outside of the battery compartment, in an attempt to dissipate heat externally, thereby passively achieving a complete fire suppression. However, such approach is ineffective in suppressing the continuous accumulation of thermal runaway energy generated internally within the sealed battery compartment, and the core of the fire still cannot be directly cooled or extinguished. Consequently, effective fire suppression can only be achieved after prolonged and extensive consumption of manpower, materials, and financial resources, while passively waiting for the battery fuel to either self-terminate or burn to exhaustion.

In addition, all detection assemblies currently used in parking lots to activate the spraying of fire extinguishing agents are installed as part of the parking structure, and thus cannot directly detect an early-stage thermal runaway events that suddenly occur within the battery compartment of an electric vehicle. These detection assemblies activate and trigger the spraying of the fire extinguishing agents only after the fire has breached the battery compartment, spread beyond the vehicle's chassis, and produced visible flames. However, by that time, thermal runaway has already erupted inside the battery compartment and cannot be mitigated. Accordingly, existing fire detection assemblies in parking lots are incapable of immediately detecting and identifying signals of thermal runaway inside the battery compartment. They also fail to issue a command to activate the spraying of fire extinguishing agents, leading to missed opportunities for early fire warnings and the optimal time window for extinguishing electric vehicle fires.

SUMMARY OF THE INVENTION

In view of this, in order to solve the problems existing in the prior art, the present invention provides a device for directly extinguishing a fire and improving the fire detection efficiency for an electric vehicle, so as to meet the needs of real-time and accurate detection of the fire, reduce the fire extinguishing time, and minimize the amount of fire extinguishing agent and associated fire damages.

In order to achieve the above-mentioned object, the present invention provides an electric vehicle fire extinguishing device. The electric vehicle fire extinguishing device includes an in-vehicle fire extinguishing agent channel unit, including an in-vehicle fire extinguishing agent channel defined by a staggered channel originally formed by gaps among a plurality of battery modules in a battery compartment and an in-vehicle structure of an electric vehicle. The electric vehicle fire extinguishing device includes a fixed embedded connector unit, including a fixed female connector for conveying fire extinguishing agent; a first fixed male connector for an electric grounding pipeline, with a base thereof fixed on a vehicle body structure; a second fixed male connector for a fire detection pipeline, wherein a base of a fire detection pipeline is placed in the in-vehicle fire extinguishing agent channel and a terminal device arranged at a tail end of a pipeline; a cavity disposed between the first fixed male connector for the electric grounding pipeline and the second fixed male connector for the fire detection pipeline to form a safety distance between the first fixed male connector for the electric grounding pipeline and the second fixed male connector for the fire detection pipeline; and a movable door cover.

In one example, the fixed embedded connector unit is engaged with an external movable connector unit that corresponds exactly thereto. The external movable connector unit includes an external movable male connector for conveying fire extinguishing agent, with a bottom base connected to a fire extinguishing agent pipeline; an first external movable female connector for the electric grounding pipeline, with a bottom connected to the electric grounding pipeline; an second external movable female connector for the fire detection pipeline, with a bottom connected to the fire detection pipeline; a handle, wrapping connection portions between the external movable male connector for conveying fire extinguishing agent and the pipelines; and a filler, separating the first external movable female connector for the electric grounding pipeline from the second external movable female connector for the fire detection pipeline.

In one example, the external movable connector unit is engaged with an extension unit for movably accommodating a plurality of pipelines, including an electric grounding pipeline; a fire detection pipeline; a fire extinguishing agent pipeline; an external movable female connector for conveying fire extinguishing agent; and a storage tray.

In one example, the extension unit is first connected to a control panel unit and includes an electric grounding pipeline connected to a grounding pipeline through a wiring terminal point; a fire detection pipeline and an external power supply pipeline, respectively connected to a wiring terminal point on a control board; and a box panel, including a regional fire lamp, an alarm buzzer, a box panel switch, and a manual selection control switch.

In one example, the extension unit is further connected to a fire extinguishing agent external supply unit and includes a fixed male connector for conveying fire extinguishing agent; a solenoid valve provided with a pipeline of a controlled source is attached, which is bypassed connected to the wiring terminal point on the control board of the control panel unit; and an external fire extinguishing agent supply pipeline.

In one example, the external movable connector unit further includes a protective cover, including a blind cover, configured in the same manner as the fixed female connector for conveying fire extinguishing agent; a male connector for the fire detection pipeline; and a terminal device.

Therefore, at the beginning of thermal runaway in the battery compartment located within the chassis of the vehicle, an initial state of the fire condition can be received and confirmed through the fire detection pipeline disposed in the in-vehicle fire extinguishing agent channel unit. A fire signal is transmitted to the control board of the control panel unit, wherein the solenoid valve is actuated to open, allowing a fire extinguishing agent stored in the fire extinguishing agent external supply unit to be released. Such that the fire extinguishing agent sequentially flows through the external fire extinguishing agent supply pipeline, the solenoid valve, the fixed male connector for conveying fire extinguishing agent, the external movable female connector for conveying fire extinguishing agent, the fire extinguishing agent pipeline, the external movable male connector for conveying fire extinguishing agent, the fixed female connector for conveying fire extinguishing agent, and the in-vehicle fire extinguishing agent channel. The fire extinguishing agent then penetrates into a break formed in the battery module where the fire occurs initially. The fire extinguishing agent is directly sprayed to extinguish the fire and perform preventive, comprehensive cooling within the battery compartment, thereby rapidly shortening the fire extinguishing time, and reducing the amount of fire extinguishing agent used as well as fire-related damages.

In order to fulfill the above-mentioned object, the present invention further provides another embodiment, which provides an electric vehicle emergency c alternative fire extinguishing device. This device includes the in-vehicle fire extinguishing agent channel unit and the fixed embedded connector unit as described in the foregoing embodiment. The fixed embedded connector unit is further engaged with an external movable connector and water pipe unit, and includes an external movable water pipe male connector; a metal wire, one end of which is bound to the external movable male connector for a movable water pipe and the other end of which is bound to a grounded facility; the movable water pipe, one end of which is connected to a bottom base of the external movable water pipe male connector, and the other end of which is connected to a bottom base of an external movable female connector for the movable water pipe; and the external movable hose female connector. The external movable connector and water pipe unit is engaged with a fire extinguishing water source external supply unit, including a male connector; a hydrant valve; and a fire extinguishing water source external supply pipeline.

Therefore, when the vehicle is driving on a road or highway and encounters a fire, the fire extinguishing system comprising the external movable connector unit, the extension unit for movably accommodating the pipelines, the control panel unit and the fire extinguishing agent external supply unit as described in the first embodiment may be unavailable. As a result, thermal runaway in one single battery module within the battery compartment may rapidly escalate into a fire involving multiple thermal runaway events. Therefore, it is preferable to adopt an electric vehicle emergency alternative fire extinguishing device for fire suppression. The method is as follows: on the one hand, metal wires are respectively bound to the external movable male connector for the movable water pipe and the grounded facility to eliminate the risk of electric shock for fire relief personnel; and on the other hand, under the condition of a reliable fire extinguishing water source, water is drained in a manner of opening the hydrant valve manually to extinguish the fire, sequentially flowing through the fire extinguishing water source external supply pipeline, the hydrant valve, the male connector, the external movable female connector for the movable water pipe, the movable water pipe, the external movable water pipe male connector, the fixed female connector for conveying fire extinguishing agent and the in-vehicle fire extinguishing agent channel. The water then penetrates into a break formed in the battery module where the fire originated, such that the water can be directly flood the fire site for extinguishment, and provide comprehensively cooling within the battery compartment, thereby rapidly shortening the fire extinguishing time, and reducing the amount of fire extinguishing water used and fire damages.

DETAILED DESCRIPTION OF THE INVENTION

Figure 1:
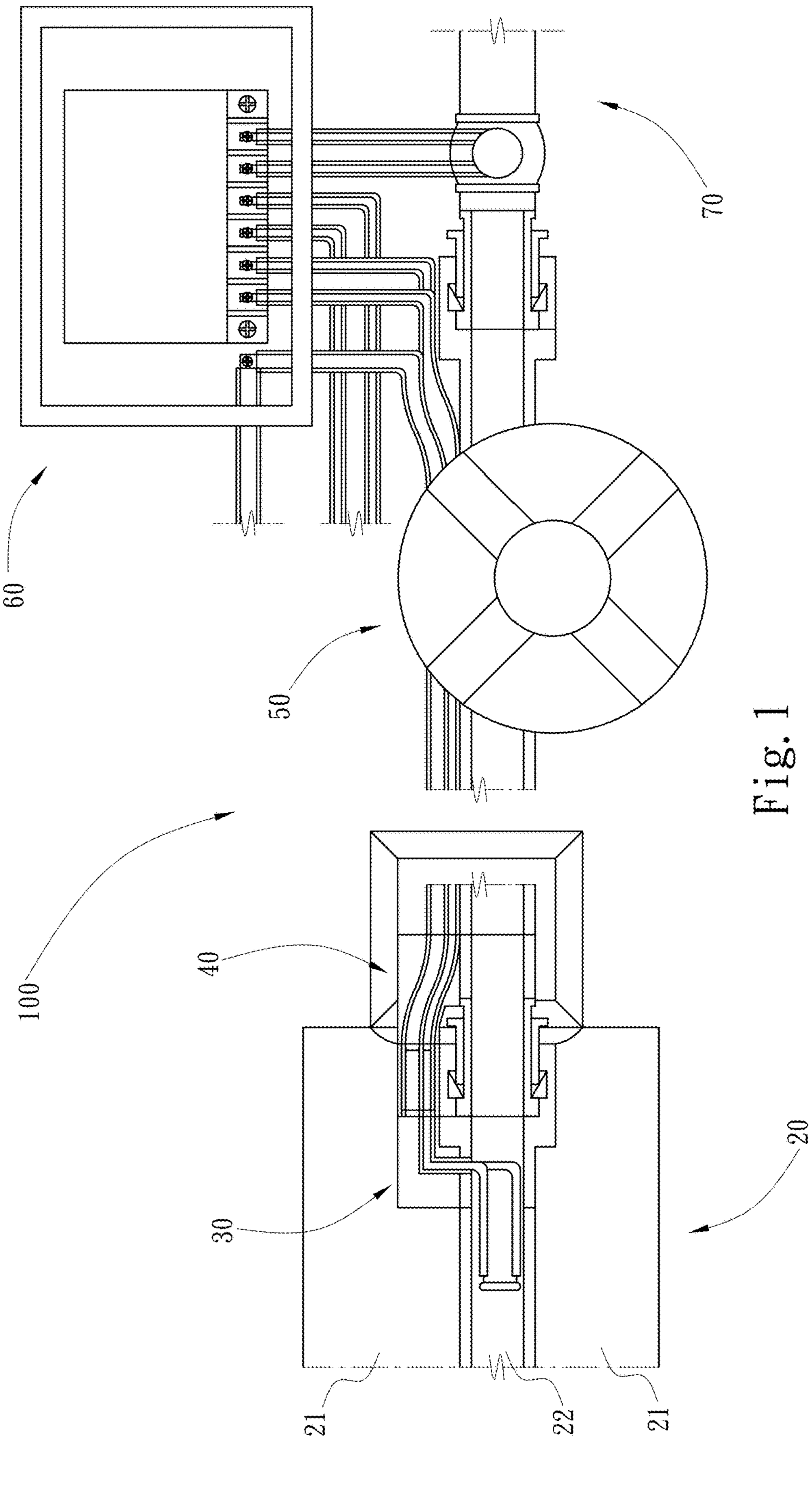
FIG. 1 is a schematic diagram of a first embodiment of the present invention.

Referring to FIG. 1, a schematic diagram of a first example of the present invention, is provided to illustrate an electric vehicle fire extinguishing device 100. The electric vehicle fire extinguishing device 100 includes an in-vehicle fire extinguishing agent channel unit 20 and a fixed embedded connector unit 30. The in-vehicle fire extinguishing agent channel unit 20 includes an in-vehicle fire extinguishing agent channel 22. The in-vehicle fire extinguishing agent channel 22 is defined by a staggered channel structure (not shown) formed by gaps between battery modules in a battery compartment and an in-vehicle structure 21 of an electric vehicle (not shown). In other words, the in-vehicle fire extinguishing agent channel 22 is directly converted from the original configuration of the battery compartment and the in-vehicle structure 21 of the electric vehicle. The in-vehicle fire extinguishing agent channel 22 extends to a surface of the in-vehicle structure 21 and connects to one end of the fixed embedded connector unit 30. In this example, the other end of the fixed embedded connector unit 30 is sequentially connected to an external movable connector unit 40, an extension unit 50 for movably accommodating pipelines, a control panel unit 60 and a fire extinguishing agent external supply unit 70.

Figure 2A:
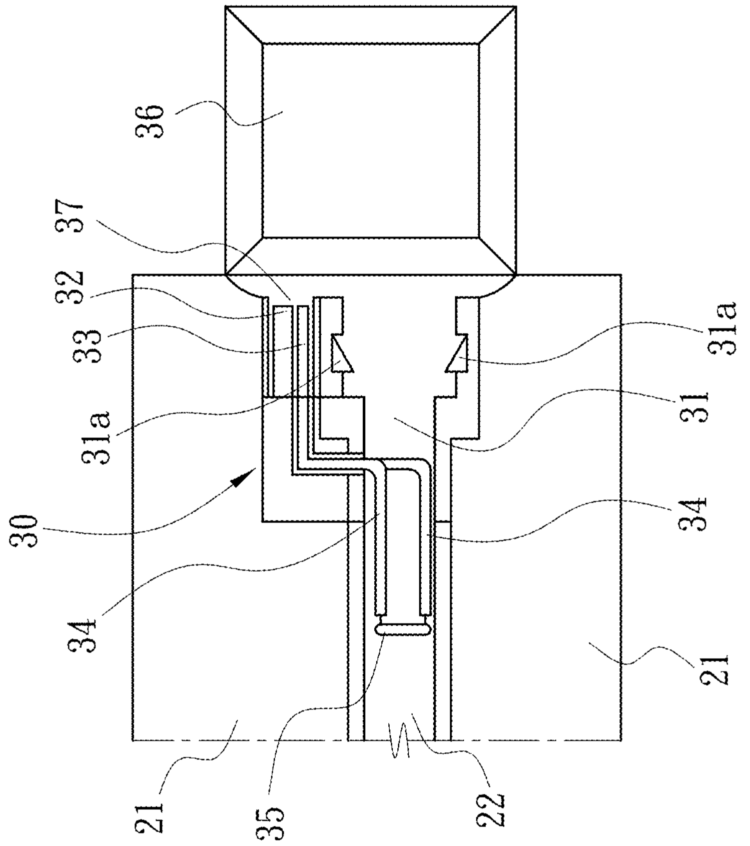
FIG. 2A is a schematic diagram of a fixed embedded connector unit of the present invention.
Figure 2B:
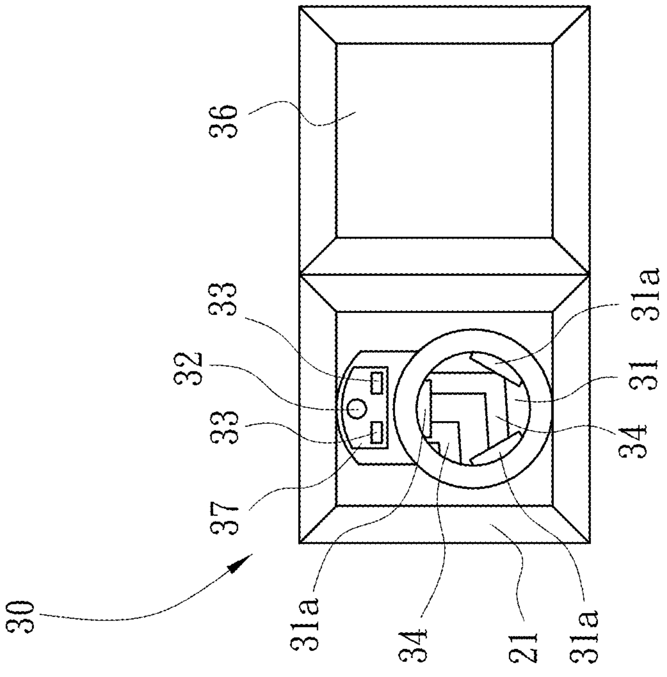
FIG. 2B is a schematic diagram of the fixed embedded connector unit in FIG. 2A from another perspective.

Referring to FIG. 2A and FIG. 2B together, schematic diagrams are provided illustrating the fixed embedded connector unit 30 in the present invention. The fixed embedded connector unit 30 includes a fixed female connector 31 for conveying fire extinguishing agent, a first fixed male connector 32 for the electric grounding pipeline, a second fixed male connector 33 for the fire detection pipeline, a cavity 37, and a movable door cover 36. The fixed female connector 31 for conveying fire extinguishing agent is directly communicated with the in-vehicle fire extinguishing agent channel 22. An annular inner wall of the fixed female connector 31 for conveying fire extinguishing agent is further provided with a plurality of movable baffles 31*a* for clamping or releasing a corresponding male connectors, which will be described in detail later. One end of the first fixed male connector 32 for the electric grounding pipeline is directly fixed to the in-vehicle structure 21. One end of the second fixed male connector 33 for the fire detection pipeline is connected to a plurality of in-vehicle fire detection pipelines 34 that are introduced into the in-vehicle fire extinguishing agent channel 22. A terminal device 35 is arranged at a tail end of the plurality of in-vehicle fire detection pipelines 34. The cavity 37 is disposed between the first fixed male connector 32 and the second fixed male connector 33, such that the two are separated in a hollow manner to form a safety distance therebetween. One side of the movable door cover 36 is fixed on the in-vehicle structure 21 of the electric vehicle. When the fixed embedded connector unit 30 is operated or deactivated, the movable door cover 36 may be opened or closed from the opposite side. In one example, at least one hinge (not shown) is disposed on the fixed side of the movable door cover 36 to be secure on the in-vehicle structure 21.

Figure 3A:
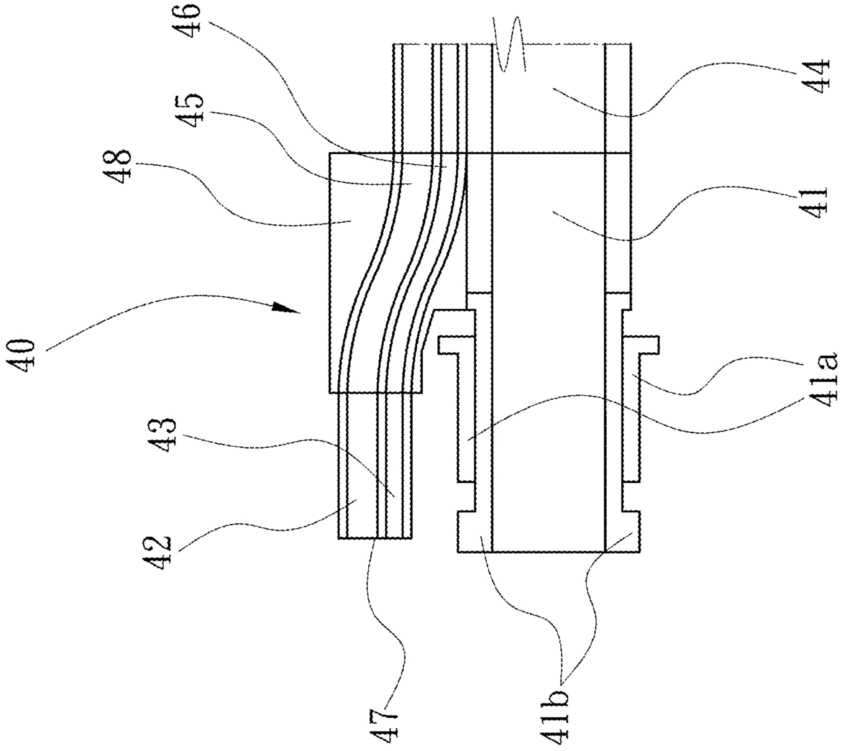
FIG. 3A is a schematic diagram of an external movable connector unit in the first embodiment of the present invention.
Figure 3B:
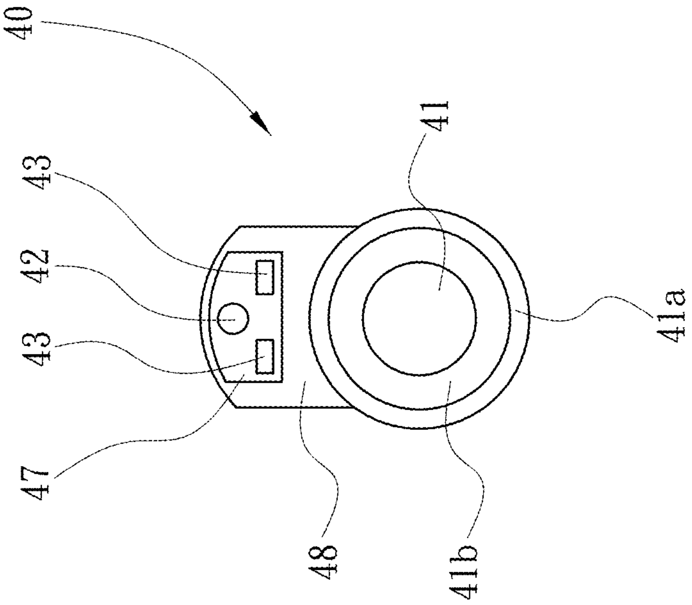
FIG. 3B is a schematic diagram of the external movable connector unit in FIG. 3A from another perspective.

Referring to FIG. 3A and FIG. 3B together, schematic diagrams are provided illustrating the external movable connector unit 40 according to the first embodiment of the present invention. The external movable connector unit 40 includes an external movable male connector 41 for conveying fire extinguishing agent, a first external movable female connector 42 for the electric grounding pipeline, a second external movable female connector 43 for the fire detection pipeline, a filler 47, and a handle 48. The external movable male connector 41 for conveying fire extinguishing agent is configured to be engaged with or disengaged from the fixed female connector 31 for conveying fire extinguishing agent. An outer annular wall of the external movable male connector 41 for conveying fire extinguishing agent is provided with a male connector movable ring 41*a* and a male connector base 41*b*. When the external movable male connector 41 for conveying fire extinguishing agent is inserted into the fixed female connector 31 for conveying fire extinguishing agent, the plurality of movable baffles 31*a* may clamp onto the male connector base 41*b* to achieve the purpose of full engagement. On the contrary, when the external movable male connector 41 for conveying fire extinguishing agent is withdrawn from the fixed female connector 31, the male connector movable ring 41*a* may be pushed to compel the plurality of movable baffles 31*a* to loosen the male connector base 41*b*, thereby enabling complete disengagement. The first external movable female connector 42 for the electric grounding pipeline is configured to be disengaged from or engaged with the first fixed male connector 32 for the electric grounding pipeline. The second external movable female connector 43 for the fire detection pipeline is configured to be disengaged from or engaged with the second fixed male connector 33 for the fire detection pipeline. The filler 47 is disposed between the first external movable female connector 42 and the second external movable female connector 43, such that the two connectors are separated by the filler 47 to form a safety distance therebetween. The filler 47 is further configured to be disengaged from or engaged with the cavity 37. The handle 48 includes a fire extinguishing agent pipeline 44 connected to a bottom base of the external movable male connector 41, an electric grounding pipeline 45 connected to the first external movable female connector 42, and a fire detection pipeline 46 connected to the second external movable female connector 43. The handle 48 wraps a connection portion between the external movable male connector 41 and the fire extinguishing agent pipeline 44, a connection portion between the first external movable female connector 42 and the electric grounding pipeline 45, and a connection portion between the second external movable female connector 43 and the fire detection pipeline 46. In one example, the handle 48 may also provide a convenient, fast and simple operational interface for engaging or disengaging the fixed embedded connector unit 30 and the external movable connector unit 40.

Figure 4A:
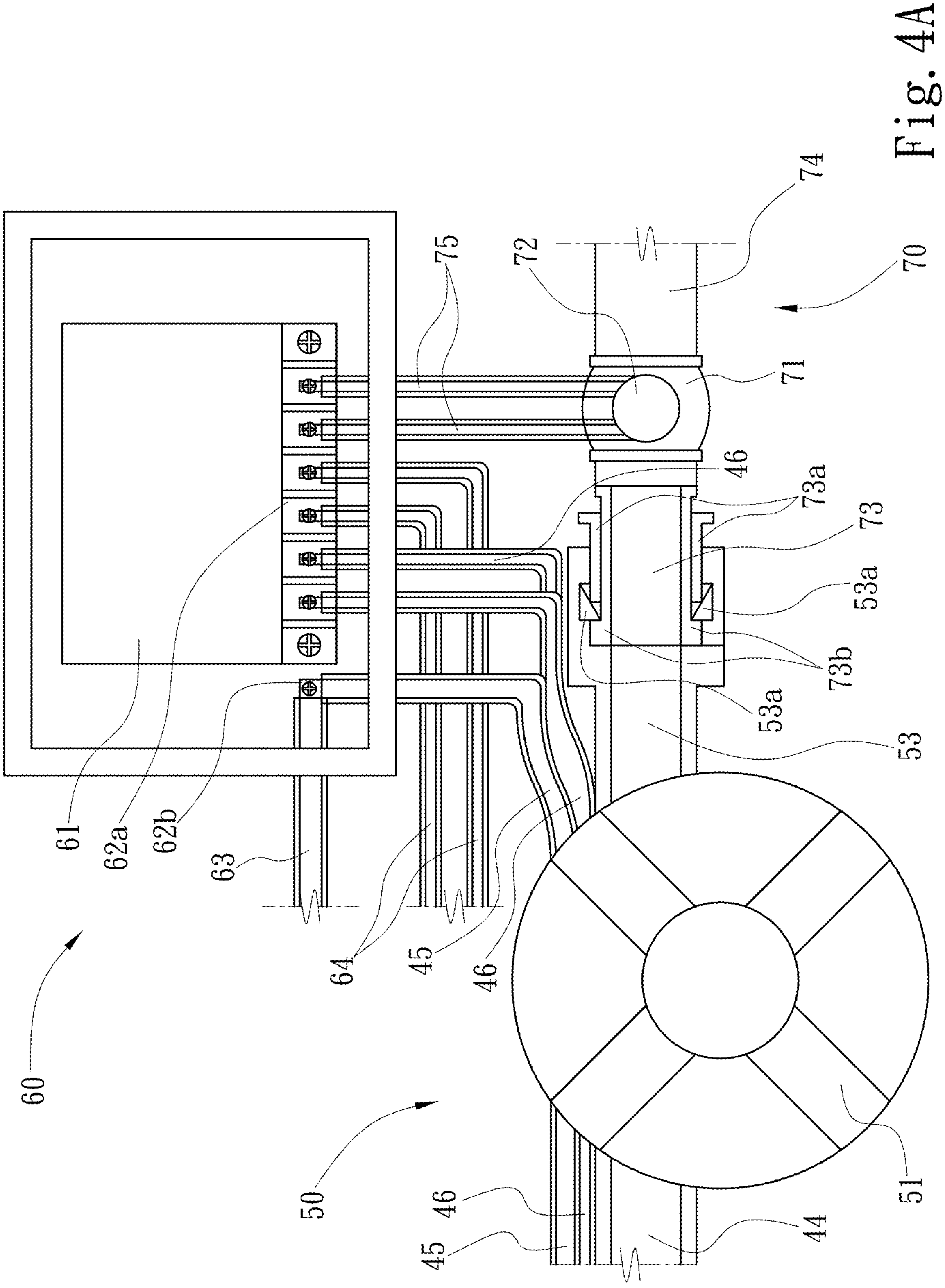
FIG. 4A is a schematic diagram of an extension unit, a control panel unit and a fire extinguishing agent external supply unit in the first embodiment of the present invention.

Referring to FIG. 4A again, a schematic diagram is provided illustrating the extension unit 50 for movably accommodating pipelines, the control panel unit 60 and the fire extinguishing agent external supply unit 70 in the first example of the present invention. The extension unit 50 receives extension pipelines from the end of the handle 48, including the fire extinguishing agent pipeline 44, the electric grounding pipeline 45 and the fire detection pipeline 46. The extension unit 50 further includes a storage tray 51 for accommodating the above extension pipelines. The fire extinguishing agent external supply unit 70 includes a solenoid valve 71, an external fire extinguishing agent supply pipeline 74 connected to one end of the solenoid valve 71, and a fixed male connector 73 for conveying fire extinguishing agent, connected to the other end of the solenoid valve 71. The control panel unit 60 is connected to the extension unit 50, and performs the following management on the fire extinguishing agent pipeline 44, the electric grounding pipeline 45 and the fire detection pipeline 46: (1) the electric grounding pipeline 45 is routed through a wiring terminal point 62*b* inside a box of the control panel unit 60 and electrically connected to a grounding pipeline 63, thereby preventing electric shock hazards in the electric vehicle fire extinguishing device 100; (2) the fire detection pipeline 46, an external power supply pipeline 64 and a pipeline 75 of a controlled source 72 of the solenoid valve 71 are respectively connected to a control board 61 through a plurality of wiring terminal points 62*a* correspondingly, so as to establish an automatic monitoring system; and (3) the fire extinguishing agent pipeline 44 is connected to a bottom base of an external movable female connector 52 for conveying fire extinguishing agent, which is pre-installed thereon. An annular inner wall of the external movable female connector 53 for conveying fire extinguishing agent is provided with a plurality of movable baffles 53*a* for clamping or releasing the fixed male connector 73 of the fire extinguishing agent external supply unit 70. When the fixed male connector 73 is inserted into the external movable female connector 53, the plurality of movable baffles 53*a* clamp onto a male connector base 73*b* of the fixed male connector 73 to achieve fully engagement. On the contrary, when the fixed male connector 73 is withdrawn from the external movable female connector 53, a male connector movable ring 73*a* of the fixed male connector 73 can be pushed to compel the plurality of movable baffle 53*a* to loosen the male connector base 73*b*, thereby achieving the fully disengagement. The wiring terminal point 62*a* allows the fire detection pipeline 46, the external power supply pipeline 64 and the pipeline 75 to enter the control board 61. The wiring terminal point 62*b* provides a protective function that allows a sudden abnormal current signal to be discharged instantaneously to the ground through the control board 61.

Figure 4B:
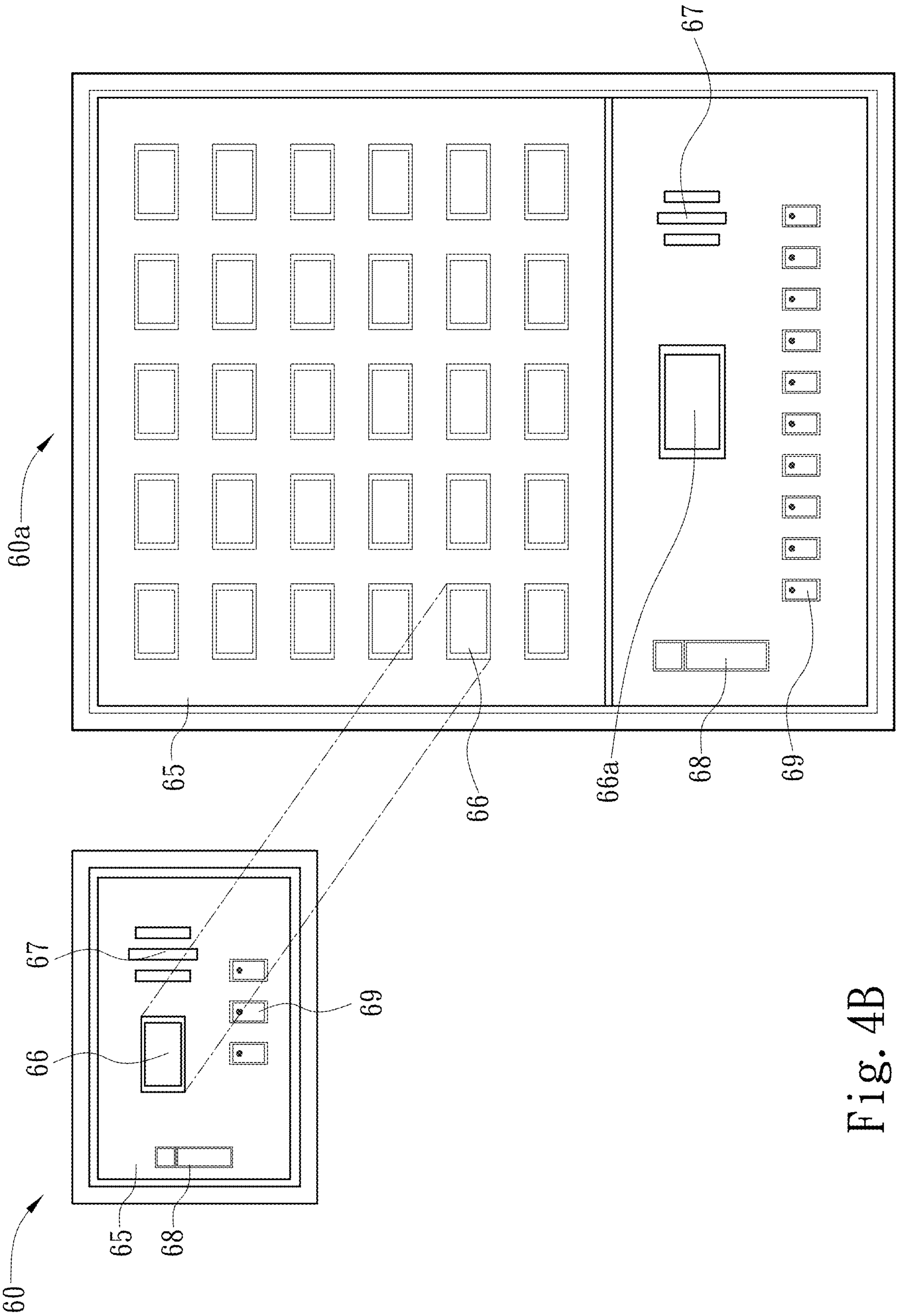
FIG. 4B is an external schematic diagram of the control panel unit in the first embodiment of the present invention.

Then referring to FIG. 4B, an external schematic diagram of the control panel unit 60, 60*a* in the first example of the present invention is shown. One single electric vehicle fire extinguishing device 100 can be automatically monitored by only one control panel unit 60, which is suitable for a single electric vehicle parking space environment. In the event of a plurality of electric vehicle parking space environments, the control panel unit 60*a* configured for centralized management and automatic monitoring is more suitable. Compared with the control panel unit 60, the control panel unit 60*a* includes one additional main fire lamp 66*a*, an increase number of regional fire lamps 66, and additional corresponding wiring terminal points and connected pipelines in accordance with the number of electric vehicle parking spaces. Except for these differences, both the control panel units 60 and 60*a* includes a box panel 65 for isolating internal and external contact, an alarm buzzer 67, a box panel switch 68 for opening or closing the box panel 65, and a manual selection control switch 69.

Due to the features of the present invention and the adopted technical means, the desired effect can only be achieved in conjunction with a usage method of the present invention. Therefore, further detailed descriptions will be provided as follows.

Figure 5A:
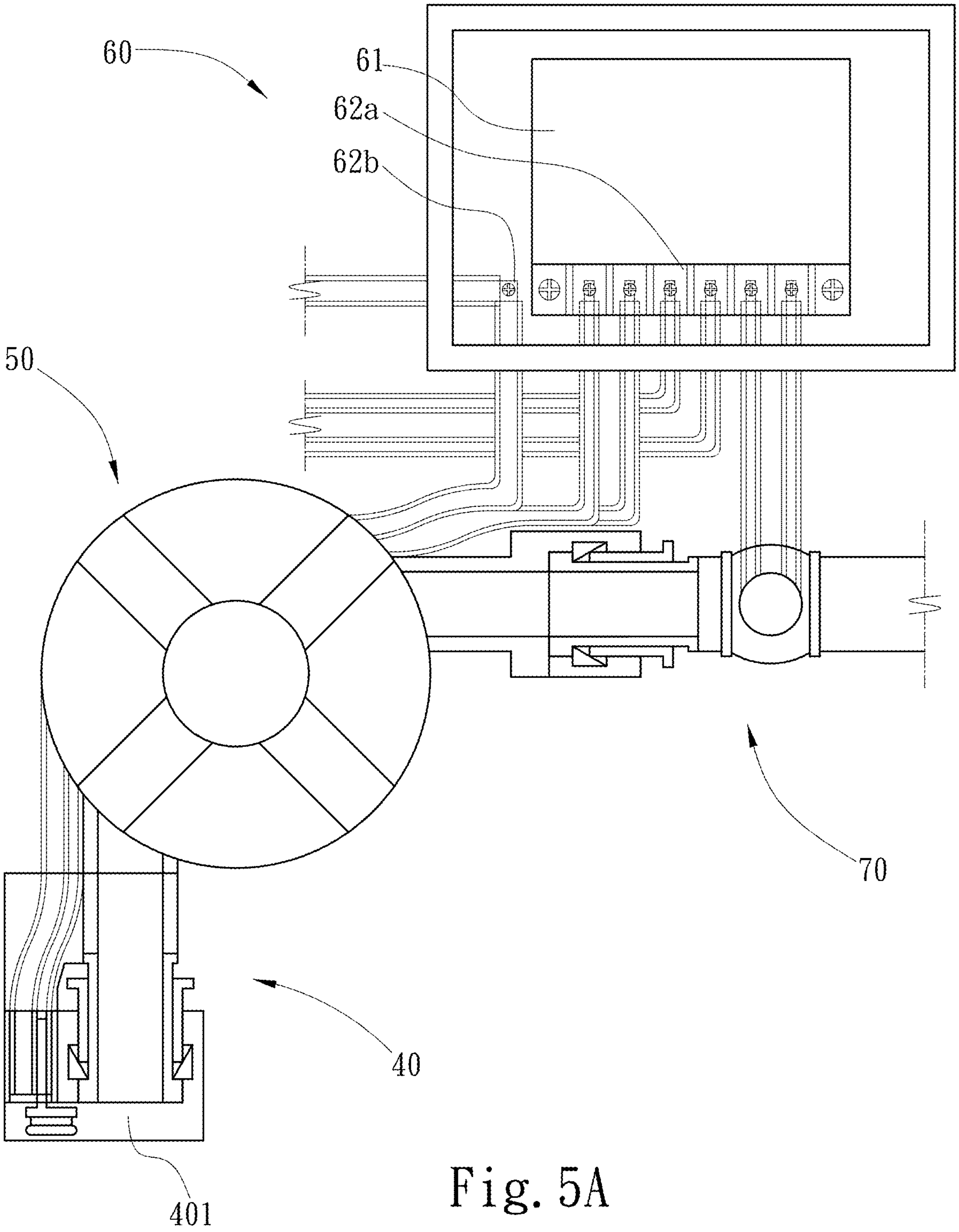
FIG. 5A is a schematic diagram in the case of waiting for use in connection with a protective cover in the first embodiment of the present invention.
Figure 5B:
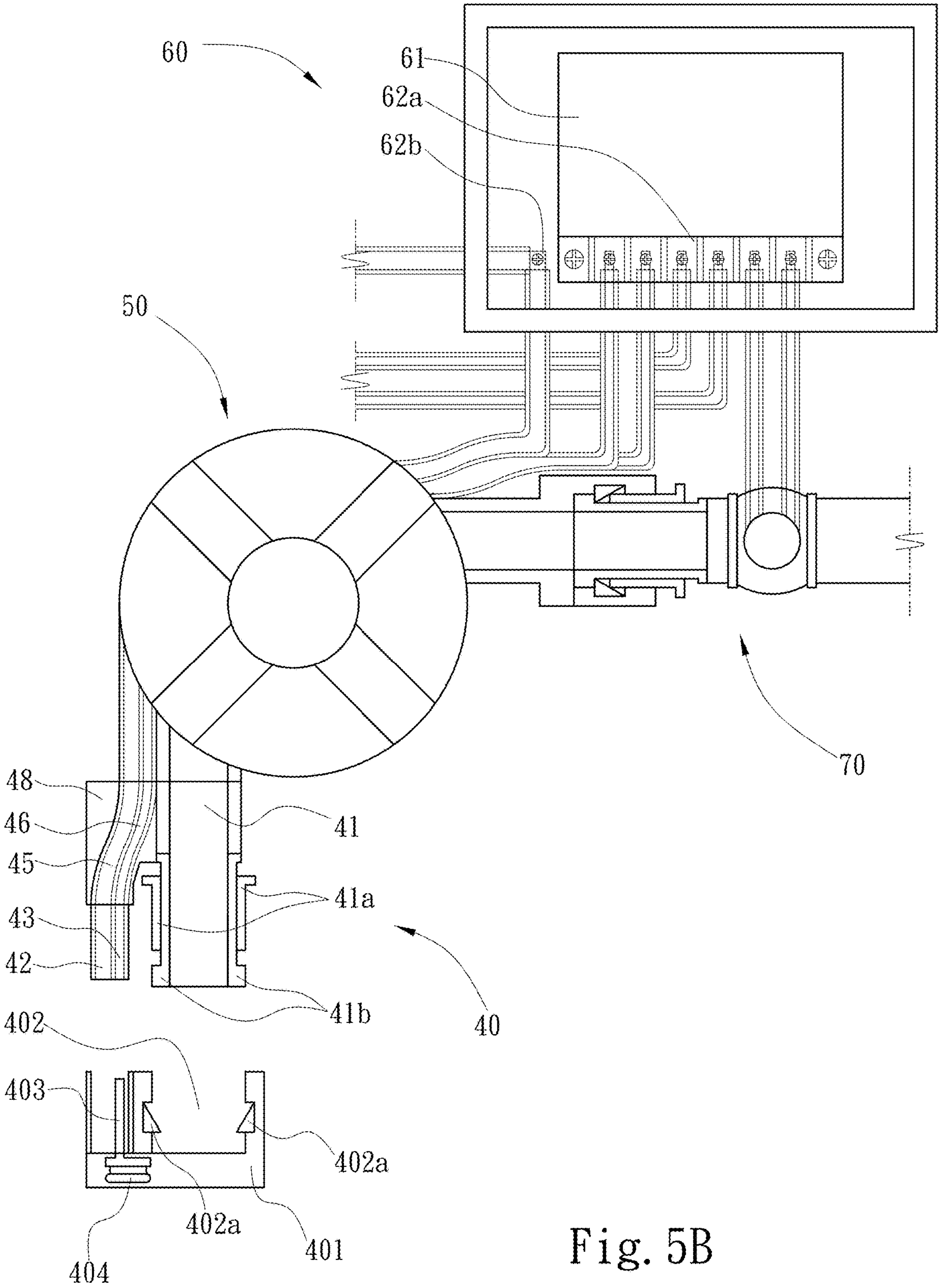
FIG. 5B is a schematic diagram in the case of waiting for use in disengagement from the protective cover in the first embodiment of the present invention.

Then referring to FIG. 5A and FIG. 5B, schematic diagrams in the first example of the present invention in the cases of a protective cover is engaged and is disengaged while using. When the electric vehicle fire extinguishing device 100 is in an idle state, and the external movable connector unit 40 is not connected to the corresponding fixed embedded connector unit 30, the external movable connector unit 40 is positioned as close as possible to the storage tray 51 and is tightly coiled. In order to ensure that the second external movable female connector 43 for the fire detection pipeline can be electrically connected to the second fixed male connector 33 for the fire detection pipeline when engaged, the fire detection pipeline 46, the second external movable female connector 43, the second fixed male connector 33, and the in-vehicle fire detection pipeline 34 are connected in sequence. Through the terminal device 35, an electronic circuit is formed and a continuous effective current (fire monitoring current) is maintained, which is transmitted to the control board 61 for automatic monitoring. The external movable connector unit 40 is protected by a protective cover 401 to solve the problem of maintaining equipment reliability in general parking environments. The protective cover 401 is operated as follows: the handle 48 is pushed to insert the external movable male connector 41 for conveying fire extinguishing agent into a blind cover 402 configured in the same manner as the fixed female connector. Then the plurality of movable baffles 402*a* clamp onto the male connector base 41*b* for engagement. At the same time, the second external movable female connector 43 for the fire detection pipeline engaged with a male connector 403 for the fire detection pipeline. A terminal device 404 is disposed at a rear end of a base of the male connector 403 to achieve a function of replacing the terminal device 35 as a substitute.

If the electric vehicle fire extinguishing device 100 comes into use, the external movable male connector 41 for conveying fire extinguishing agent must be disengaged from the protective cover 401. At this time, the male connector movable ring 41*a* is pushed to compel the plurality of movable baffles 402*a* of the blind cover 402 to loosen the male connector base 41*b* for disengagement. The handle 48 is pulled to separate the second external movable female connector 43 for the fire detection pipeline from the male connector 403 for the fire detection pipeline, so as to complete the disengagement.

On the other hand, after an electric vehicle (not shown) drives into a parking space and is in a stationary state, the movable door cover 36 can be pulled open from the inside of the vehicle body, and the handle 48 can be taken out from the storage tray 51 to operate the external movable connector unit 40, thereby stretching all the movable pipelines of the extension unit 50 and approaching the fixed embedded connector unit 30. An operation method is as follows: the handle 48 is pushed to make the first external movable female connector 42 for the electric grounding pipeline and the first fixed male connector 32 for the electric grounding pipeline engaged; the second external movable female connector 43 for the fire detection pipeline is then engaged with the second fixed male connector 33 for the fire detection pipeline; and the external movable male connector 41 for conveying fire extinguishing agent is then introduced into the fixed female connector 31 for conveying fire extinguishing agent, and the plurality of movable baffles 31*a* are used to clamp the male connector base 41*b* to complete the engagement.

When a fire occurs in the electric vehicle, the in-vehicle fire detection pipeline 34 of the electric vehicle fire extinguishing device 100 detects combustion products to confirm the occurrence of the fire. Upon detection, the terminal device 35 is bypassed, and the in-vehicle fire detection pipeline 34 is directly electrically connected through the fire detection pipeline 33, the second external movable female connector 43 for the fire detection pipeline and the fire detection pipeline 46. As a result, the original fire monitoring current is suddenly changed into a fire action current and transmitted to the control board 61. Next, the regional fire lamp 66 is activated, and the alarm buzzer 67 begins to sound (emitting a warning sound) to alert nearby personnel at the control panel unit 60 through both visual and auditory cues. The personnel may choose to manually operate the manual selection control switch 69 to override the automatic control of the control panel unit 60, or allow the control panel unit 60 to continue in automatic mode. Once the fire is confirmed after a preset time, the control board 61 transmits an electrical signal through the pipeline 75 to the controlled source 72, causing the solenoid valve 71, which is originally in a closed state, to open. This prompts the fire-extinguishing agent (e.g., water) to sequentially flow through the external fire extinguishing agent supply pipeline 74, the solenoid valve 71, the fixed male connector 73 for conveying fire extinguishing agent, the external movable female connector 53 for conveying fire extinguishing agent, the fire extinguishing agent pipeline 44, the external movable male connector 41 for conveying fire extinguishing agent, the fixed female connector 31 for conveying fire extinguishing agent, and the in-vehicle fire extinguishing agent channel 22. Finally, the fire extinguishing agent reaches a break of the battery module where the fire occurs initially, such that the fire extinguishing agent is directly sprayed to extinguish the fire and perform preventive and comprehensive cooling in the battery compartment, thereby rapidly shortening the fire extinguishing time and reducing the amount of fire extinguishing agent used and fire-related damages.

However, if the electric vehicle does not catch fire, the electric vehicle fire extinguishing device 100 remains in a normal monitoring mode. In this state, the fire detection pipeline 46, the second external movable female connector 43 for the fire detection pipeline, the second fixed male connector 33 for the fire detection pipeline, the in-vehicle fire detection pipeline 34 and the terminal device 35 form a closed electronic loop. An effective current (fire monitoring current) is continuously maintained and reported to the control board 61 to continuously and automatically monitor any potential early-stage fire that may occur. This system allows for effective fire control and rapid activation of the fire extinguishing agent, as needed. When the electric vehicle is about to leave the parking space, the external movable male connector 41 for conveying fire extinguishing agent is disengaged from the fixed female connector 31, and the male connector movable ring 41*a* is pushed to compel the plurality of movable baffles 31*a* to loosen the male connector base 41*b*, thereby achieving complete disengagement. At the same time, by directly pulling the handle 48, the first external movable female connector 42 for the electric grounding pipeline 42 is compelled to be completely disengaged from the first fixed male connector 32, and the second external movable female connector 43 for the fire detection pipeline is compelled to be completely disengaged from the second fixed male connector 33. After confirming that the fixed embedded connector unit 30 is completely disengaged from the external movable connector unit 40, the movable door cover 36 can be closed and returned into the vehicle body. The electric vehicle is then free to leave the parking space, and the electric vehicle fire extinguishing device 100 returns to a standby state shown in FIG. 5A again, ready for the next use.

Figure 6:
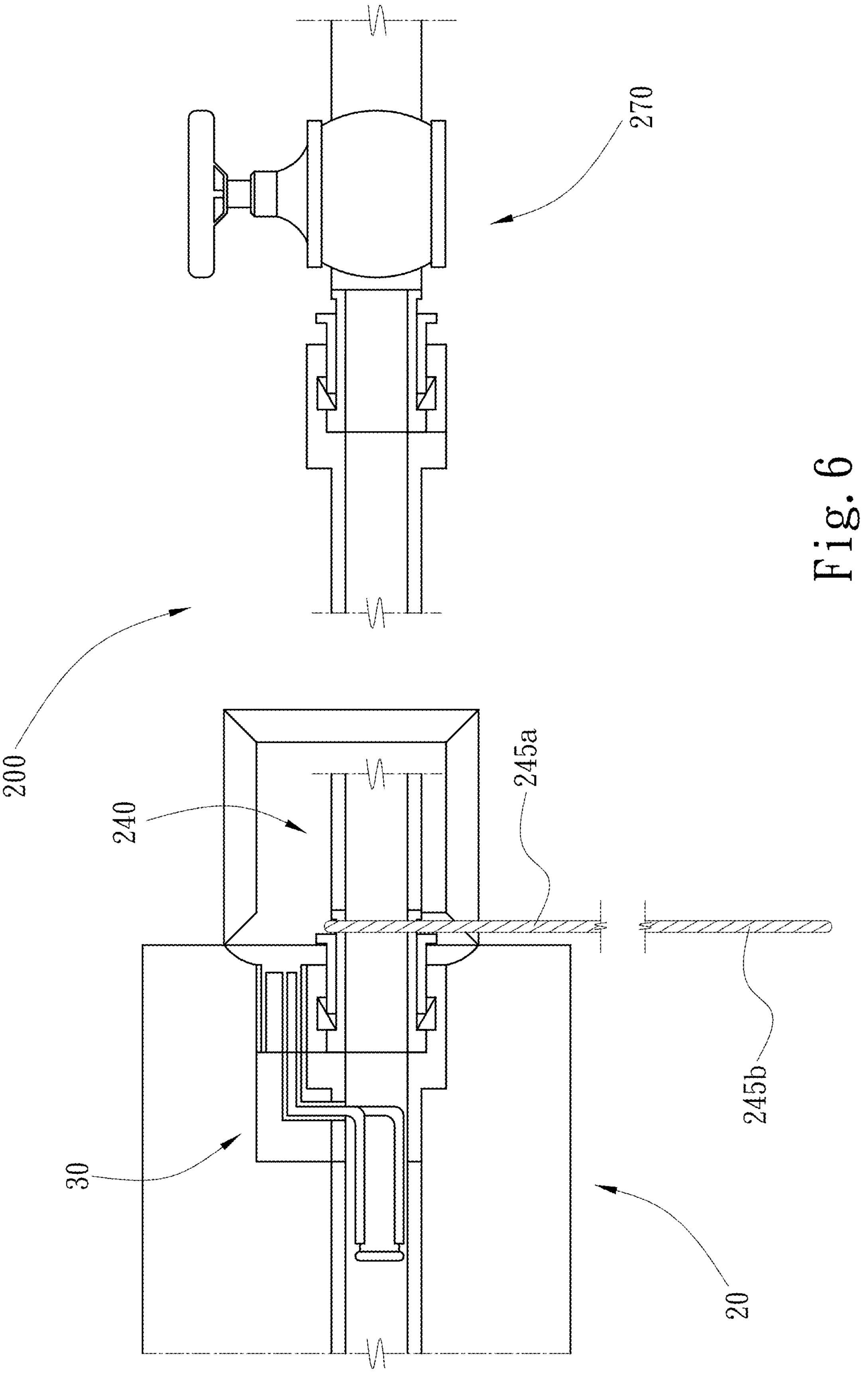
FIG. 6 is a schematic diagram of a second embodiment of the present invention.

Referring to FIG. 6, a schematic diagram of a second example of the present invention is shown, which is different from the first embodiment as follows.

The external movable connector unit 40, the extension unit 50, the control panel unit 60 and the fire extinguishing agent external supply unit 70 of the electric vehicle fire extinguishing device 100 of the present invention are disposed at a specific location (e.g., a parking space). Therefore, after the electric vehicle leaves the specific location and encounters a fire on the road, highway or other similar scenarios, the fire extinguishing system, comprising the external movable connector unit 40, the extension unit 50, the control panel unit 60 and the fire extinguishing agent external supply unit 70, will no longer be available. As a result, the battery modules within the battery compartment of the electric vehicle may escalate from a single thermal runaway to multiple thermal runaway events. Therefore, the second example of the present invention provides an emergent alternative solution. In this example, an electric vehicle fire extinguishing device 200 includes an in-vehicle fire extinguishing agent channel unit 20, a fixed embedded connector unit 30, an external movable connector and water pipe unit 240, and a fire extinguishing water source external supply unit 270 connected to the external movable connector and water pipe unit 240. The structures of the in-vehicle fire extinguishing agent channel unit 20 and the fixed embedded connector unit 30 are the same as those in the first embodiment, and will not be repeated herein. The external movable connector and water pipe unit 240 includes an external movable male connector 241 for a movable water pipe, a movable water pipe 244, and an external movable female connector 246 for the movable water pipe. The external movable connector and water pipe unit 240 further includes a metal wire (e.g., a steel cable), one end 245*a* of the metal wire being bound to the external movable male connector 241, and the other end 245*b* of the metal wire being bound to a grounded facility. The fire extinguishing water source external supply unit 270 includes a fire extinguishing water source external supply pipeline 274 and a hydrant valve 271 connected to the fire extinguishing water source external supply pipeline 274.

Figure 7:
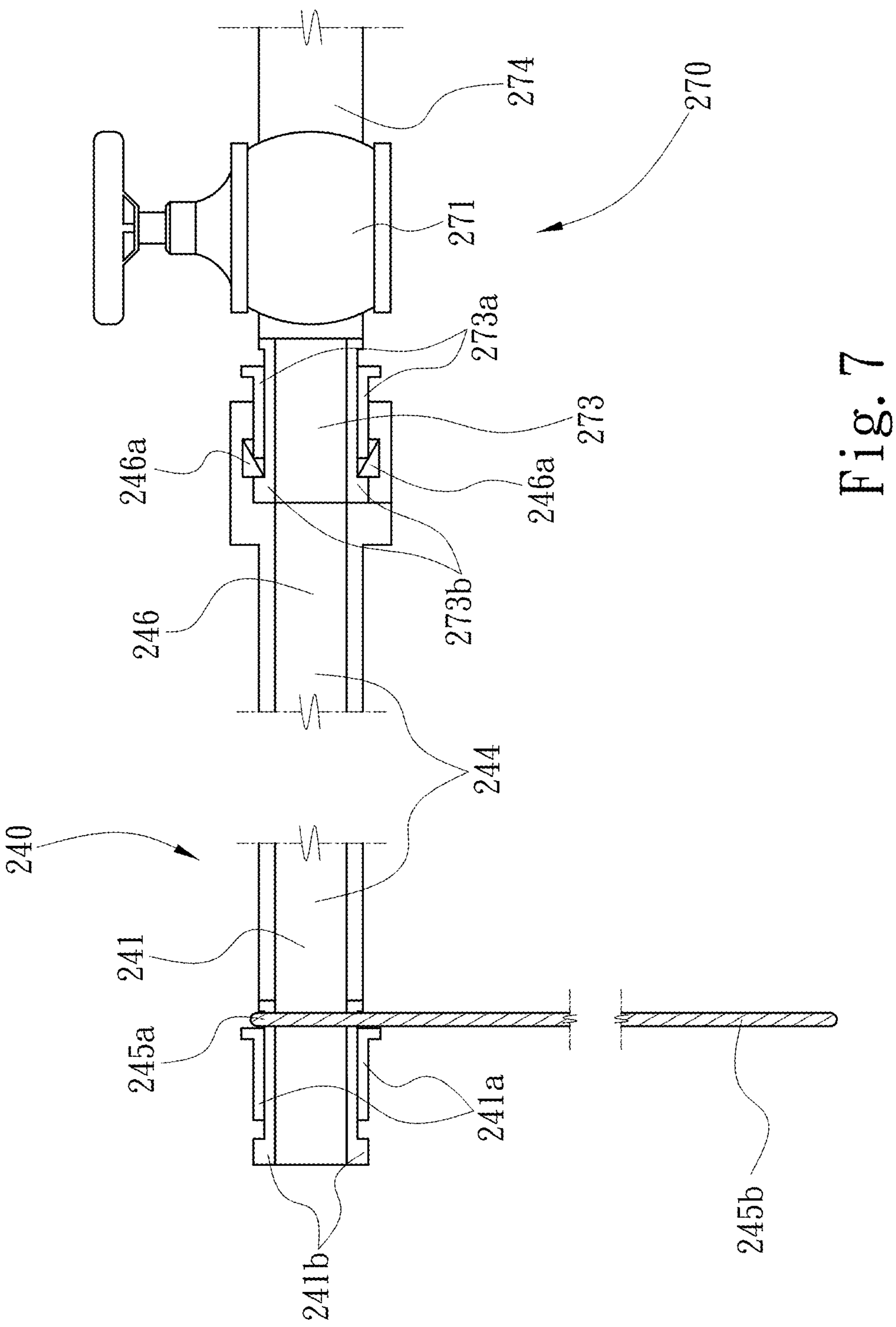
FIG. 7 is a schematic diagram of an external movable connector and water pipe unit and a fire extinguishing water source external supply unit in the second embodiment of the present invention.

Also referring to FIG. 2 and FIG. 7. FIG. 2 is a schematic diagram of the fixed embedded connector unit of the present invention, and FIG. 7 is a schematic diagram of the external movable connector and water pipe unit 240 and the fire extinguishing water source external supply unit 270 in the second example of the present invention. When the electric vehicle fire extinguishing device 200 is in a fire state and fire response personnel arrive on site, a male connector 273 of the hydrant valve 271 must be first inserted into the external movable female connector 246 for the movable water pipe. The plurality of movable baffles 246*a* on the external movable female connector 246 clamp onto a male connector base 273*b* of the male connector 273 to achieve complete engagement. Then, the external movable male connector 241 for the movable water pipe, that is bound with one end 245*a* of the metal wire, is picked up. The movable water pipe 244 is pulled and extended towards the fixed embedded connector unit 30. The other end 245*b* of the metal wire is bound to a grounded facility, such as a street lamp or traffic light post along the path, thereby eliminating the risk of electric shock during firefighting. The movable water pipe 244 provides a safety relief distance between the burning electric vehicle and the fire extinguishing water source external supply unit 270. At the same time, fire relief personnel may operate another waterline to spray water onto the movable door cover 36 and pry it open with an iron bar. Water should also be continuously sprayed into the in-vehicle fire extinguishing agent channel 22 as much as possible to assist in dissipating heat. Subsequently, the external movable male connector 241 for the movable water pipe is inserted into the fixed female connector 31 for conveying fire extinguishing agent. The plurality of movable baffles 31*a* are used to clamp the male connector base 241*b* for engagement. The hydrant valve 271 is then manually opened, allowing water to sequentially flow through the fire extinguishing water source external supply pipeline 274, the hydrant valve 271, the male connector 273, the external movable female connector 246 for the movable water pipe, the movable water pipe 244, the external movable male connector 241 for the movable water pipe, the fixed female connector 31 for conveying fire extinguishing agent, and the in-vehicle fire extinguishing agent channel 22, and finally deep into the battery compartment, where it is directly delivered to flood the source of combustion. This forces the battery compartment to rapidly lose a high temperature condition of thermal runaway. Without this critical factor, the combustion can no longer occur. Only minimal residual fire may remain, which can be extinguished by a secondary water line, thereby greatly shortening the fire extinguishing time, and reducing the amount of fire extinguishing water and fire-related damages.

As mentioned above, after the fire extinguishing has been completed, the switch of the hydrant valve 271 is manually turned off. The external movable male connector 241 for the movable water pipe is then disengaged from the fixed female connector 31 for conveying fire extinguishing agent. This is achieved by pushing the male connector movable ring 241*a* to compel the plurality of movable baffles 31*a* to loosen the male connector base 241*b*, thereby achieving complete disengagement. Next, both ends 245*a* and 245*b* of the metal wire are detached. Following that, the male connector 273 of the hydrant valve 271 is withdrawn from the external movable female connector 246 for the movable water pipe. The male connector movable ring 273*a* is pushed to cause the plurality of movable baffles 246*a* to loosen the male connector base 273*b*, thereby achieving complete disengagement. Finally, the movable water pipe 244, the external movable male connector 241 and the external movable female connector 246 are collectively coiled and compacted, such that making the external movable connector, the water pipe unit 240 and the fire extinguishing water source external supply unit 270 being restored to their original states, and are ready for the next use.

The invention claimed is:

1. An electric vehicle fire extinguishing device, comprising:

an in-vehicle fire extinguishing agent channel unit, comprising an in-vehicle fire extinguishing agent channel defined by a staggered channel originally formed by gaps among a plurality of battery modules in a battery compartment and by an in-vehicle structure of an electric vehicle; and a fixed embedded connector unit, disposed on a surface of a vehicle body structure and connected to the in-vehicle fire extinguishing agent channel, the fixed embedded connector unit comprising a fixed female connector for conveying fire extinguishing agent, a first fixed male connector for an electric grounding pipeline, a second fixed male connector for a fire detection pipeline, a cavity, and a movable door cover; wherein the fixed female connector for conveying fire extinguishing agent is directly connected to the in-vehicle fire extinguishing agent channel, and an annular inner wall of the fixed female connector is provided with a plurality of movable baffles; a base of the first fixed male connector for the electric grounding pipeline is directly fixed on the in-vehicle structure; one end of the second fixed male connector for the fire detection pipeline is connected to a plurality of in-vehicle fire detection pipelines introduced into the in-vehicle fire extinguishing agent channel, and a first terminal device is arranged at a tail end of the plurality of in-vehicle fire detection pipelines; the cavity is disposed between the first fixed male connector and the second fixed male connector; one side of the movable door cover comprises a hinge and fixed to the in-vehicle structure of the electric vehicle, such that when the fixed embedded connector unit is operated or deactivated, the movable door cover is opened or closed from an other side of the movable door cover.

2. The electric vehicle fire extinguishing device according to claim 1, further comprising:

an external movable connector unit, connected to one end of the fixed embedded connector unit not connected to the in-vehicle fire extinguishing agent channel;

an extension unit for movably accommodating a plurality of pipelines, connected to one end of the external movable connector unit not connected to the fixed embedded connector unit, wherein the plurality of pipelines comprise a first pipeline portion configured to rely on an electric power for automatic control, for monitoring whether fire control is in automatic or manual mode, controlling fire extinguishing, and eliminating electric shock accidents, and a second pipeline portion configured to rely on an external supply of a fire extinguishing agent for delivering the fire extinguishing agent into the vehicle to extinguish the fire in the electric vehicle;

a control panel unit, configured to receive and accommodate the first pipeline portion from the extension unit; and a fire extinguishing agent external supply unit, connected to the second pipeline portion.

3. The electric vehicle fire extinguishing device according to claim 2, wherein the external movable connector unit comprises:

an external movable male connector for conveying fire extinguishing agent, comprising a male connector movable ring and a male connector base, the male connector movable ring and the male connector base disposed correspondingly to a plurality of movable baffles of the fixed female connector for conveying fire extinguishing agent to be engaged with or disengaged from each other;

a first external movable female connector for the electric grounding pipeline, disposed correspondingly to the first fixed male connector for the electric grounding pipeline to be engaged with or disengaged from each other;

a second external movable female connector for the fire detection pipeline, disposed correspondingly to the second fixed male connector for the fire detection pipeline to be engaged with or disengaged from each other;

a filler, disposed between the first external movable female connector for the electric grounding pipeline and the second external movable female connector for the fire detection pipeline, to form a safety distance therebetween, the filler disposed correspondingly to the cavity to be engaged with or disengaged from each other; and a handle, comprising a fire extinguishing agent pipeline connected to a bottom base of the external movable male connector for conveying fire extinguishing agent, an electric grounding pipeline connected to the first external movable female connector for the electric grounding pipeline, and a fire detection pipeline connected to the second external movable female connector for the fire detection pipeline; wherein the handle wraps a connection portion between the external movable male connector and the fire extinguishing agent pipeline, a connection portion between the first external movable female connector and the electric grounding pipeline, and a connection portion between the second external movable female connector and the fire detection pipeline, and wherein the handle is configured to be operated by a user to engage or disengage the fixed embedded connector unit with or from the external movable connector unit.

4. The electric vehicle fire extinguishing device according to claim 3, wherein the external movable connector unit further comprises a protective cover, when the external movable connector unit is not connected to the fixed embedded connector unit, the protective cover is connected to the external movable connector unit to protect the external movable connector unit, wherein the protective cover comprises a blind cover for conveying fire extinguishing agent, a male connector for the fire detection pipeline, and a second terminal device, wherein the blind cover comprises the plurality of movable baffles, which disposed correspondingly to the male connector base and the male connector movable ring of the external movable male connector for conveying fire extinguishing agent to be engaged with or disengaged from each other, wherein the male connector for the fire detection pipeline is disposed correspondingly to the second external movable female connector for the fire detection pipeline to be engaged with or disengaged from each other; and wherein the second terminal device is disposed at a tail end of a base of the male connector for the fire detection pipeline.

5. The electric vehicle fire extinguishing device according to claim 3, wherein the extension unit receives the fire extinguishing agent pipeline, the electric grounding pipeline, and the fire detection pipeline from the end of the handle; wherein the extension unit comprises a storage tray and an external movable female connector for conveying fire extinguishing agent, and the storage tray accommodates the fire extinguishing agent pipeline, the electric grounding pipeline and the fire detection pipeline; wherein a bottom base of the external movable female connector for conveying fire extinguishing agent is sleeved with the fire extinguishing agent pipeline; and wherein the external movable female connector comprises the plurality of movable baffles, which are disposed correspondingly to the male connector base and the male connector movable ring of the fixed male connector for conveying fire extinguishing agent of the fire extinguishing agent external supply unit to be engaged with or disengaged from each other.

6. The electric vehicle fire extinguishing device according to claim 2, wherein the control panel unit comprises a box panel; a box panel switch configured to open or close the box panel; a regional fire lamp configured to light up when the electric vehicle is on fire; an alarm buzzer configured to emit a warning sound when the electric vehicle is on fire; a control board configured to operate functions and protection measures for fire detection, fire extinguishing control, and manual intervention, based on a received signal; a wiring terminal point configured to allow the fire detection pipeline, an external power supply pipeline, and a pipeline of a controlled source of a solenoid valve to be connected to the control board; and a manual selection control switch configured to allow a user to manually interfere with the automatic control of the control board.

7. The electric vehicle fire extinguishing device according to claim 2, wherein the fire extinguishing agent external supply unit comprises:

- an external fire extinguishing agent supply pipeline, configured to be filled with a fire extinguishing agent inside;
- a solenoid valve, communicated with the external fire extinguishing agent supply pipeline and comprising a controlled source with a pipeline receiving an electric signal from a control board and transmitting the electric signal to the controlled source to open or close a valve of the solenoid valve, thereby controlling an output of the fire extinguishing agent; and
- a fixed male connector for conveying fire extinguishing agent, comprising a male connector base and a male connector movable ring, the connector base, and the connector movable ring disposed correspondingly to the plurality of movable baffles of an external movable female connector for conveying fire extinguishing agent of the extension unit to be engaged with or disengaged from each other.

8. The electric vehicle fire extinguishing device according to claim 1, further comprising an external movable connector and water pipe unit, connected to one end of the fixed embedded connector unit that is not connected to the in-vehicle fire extinguishing agent channel; and a fire extinguishing water source external supply unit, connected to the external movable connector and water pipe unit, and configured to deliver fire extinguishing water in an event of a fire in the electric vehicle.

9. The electric vehicle fire extinguishing device according to claim 8, wherein the external movable connector and water pipe unit comprises:

- an external movable male connector for a movable water pipe, comprising a male connector base and a male connector movable ring, the male connector base and the male connector movable ring disposed correspondingly to the plurality of movable baffles of the fixed female connector for conveying fire extinguishing agent to be engaged with or disengaged from each other;
- a metal wire, bound to the external movable male connector for the movable water pipe at one end, and bound to a grounded facility at an other end;
- a movable water pipe, sleeved on a bottom base of the external movable male connector for the movable water pipe at one end, and sleeved on a bottom base of an external movable female connector for the movable water pipe at the other end; and
- the external movable female connector for the movable water pipe, comprising a bottom base sleeved on the other end of the movable water pipe, and a plurality of movable baffles disposed correspondingly to a male connector base and a male connector movable ring of a male connector of a hydrant valve of the fire extinguishing water source external supply unit to be engaged with or disengaged from each other.

10. The electric vehicle fire extinguishing device according to claim 8, wherein the fire extinguishing agent external supply unit comprises:

- a hydrant valve, comprising a male connector, which comprising a male connector base and a male connector movable ring, wherein the male connector base and the male connector movable ring are disposed correspondingly to the plurality of movable baffles of an external movable female connector for the movable water pipe to be engaged with or disengaged from each other; and
- a fire extinguishing water source external supply pipeline, configured to be filled with fire extinguishing water at all times to deliver water for extinguishing a fire when needed.

* * * * *